Patented June 18, 1940

2,205,045

UNITED STATES PATENT OFFICE 2,205,045

PREPARATION OF ACYLATED 3-HYDROXY-BIS-NOR CHOLENIC ACIDS

James Robertson Myles, Cheshire, England, assignor to Imperial Chemical Industries Limited, a corporation of Great Britain No Drawing. Application February 14, 1938, Serial No. 190,494. In Great Britain February 19, 1937

11 Claims. (Cl. 260—397)

This invention relates to the purification of crude mixtures of sterols; more particularly it relates to the removal of sitosterol from crude mixtures of sterols; still more particularly it relates to the selective oxidation of stigmasterol in crude mixtures of sterols, still more particularly it relates to the production of acylated 3-hydroxy-bis-nor-cholenic acids, and still more particularly it relates to the preparation of 3-acetoxy-bis-nor-cholenic acid, the formula of which may be expressed as:

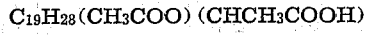

$C_{19}H_{28}(CH_3COO)(CHCH_3COOH)$

Two prior processes have been proposed for the manufacture of this substance. In one, pure stigmasterol is first prepared and the acetylated sterol is oxidised by means of ozone after the ring double bond has been protected by addition of bromine. In the other, a mixture of sterols such as phytosterols from soya bean oil, which contains both stigmasterol and sitosterol, is oxidised by means of chromic acid to produce a mixture of acids including bis-nor-cholenic acid and neutral products from which mixture the desired product is subsequently isolated.

An object of the present invention is the direct production of acylated 3-hydroxy-bis-nor-cholenic acids especially 3-acetoxy-bis-nor-cholenic acid from the crude mixture of sterols, such as the phytosterols of soya bean oil, calaber bean oil, etc., generally available as the source, without on the one hand having first to isolate pure stigmasterol, or on the other hand obtaining not only the desired products, but also considerable quantities of undesired products, due to breakdown and other effects of chromic acid oxidation. A further object is to obtain an extract of sitosterol which is substantially free from stigmasterol but which may contain other sterols. Still other objects will appear hereinafter.

The above and other objects are accomplished according to the following invention in which a crude mixture of sterols containing stigmasterol in particular the phytosterols of soya bean oil or calaber bean oil, is oxidised, after the protection of the hydroxy group by ester formation (as for instance with acetic acid) and of the ring double-bond by the addition of bromine or other halogens or hydrogen halides, by means of ozone; this results in the splitting of the side chain of the stigmasterol without affecting the other sterols present. After debromination (e. g. by means of zinc and acetic acid), the desired product can readily be isolated in the form of a suitable salt, suitably the sodium salt. The sitosterol and other sterols may be recovered in a solvent from the cholenic acid.

The invention will be further understood, but is not to be limited by the following example:

Example

A 5% solution in ether of phytosterol acetate containing 5% of stigmasterol acetate (obtained from soya bean oil) is treated with 1 molecular proportion of bromine added as a 5% solution of bromine in acetic acid at 0° C. Ozonised oxygen is then passed through the solution until no further absorption of ozone takes place. The ether is removed and powdered zinc is added; the mixture is then heated for one hour on the water bath, which results in the removal of the bromine.

After filtration and addition of water, the reaction products, which now consist of acetoxy-bis-nor-cholenic acid and sitosterol acetate are taken up in ether. Acetic acid is removed by washing with water and the sodium salt of the acetoxy-bis-nor-cholenic acid is precipitated with caustic soda solution. The sodium salt is suspended in water, acidified and the acid extracted with ether. On removal of the ether and recrystallisation of the product from aqueous acetone, pure acetoxy-bis-nor-cholenic acid is obtained. The yield is 75-80% of the theoretical yield. Pure sitosterol acetate may be recovered from the first ether mother liquor.

It will be understood that the proportion of bromine used is important. The phytosterol mixture contains sitosterol and stigmasterol which have almost identical molecular weights but sitosterol has one double bond only and stigmasterol has two double bonds, one in the ring and one in the side chain. The addition of one molecular proportion of bromine, therefore, brominates one double bond of each sterol, i. e. it protects the double bonds in the rings leaving the side chain double bond of stigmasterol free for reaction.

In place of the sterol acetate described above, other esters of aliphatic or aromatic acids may be used, such as the formate, propionate, benzoate, phenylacetate and the like. Esters of acids of the formula RCOOH wherein R is an aliphatic, aromatic or alicyclic hydrocarbon radical are preferred, and particularly those wherein R is free from ethylenic or olefinic unsaturation, i. e. is unsaturated.

Any of the usual methods of debrominating organic compounds may be used in place of the type described above. Thus, magnesium or zinc dust in alcohol or potassium iodide or other well known processes may be availed of.

Other solvents than ether may likewise be used although that solvent is preferred. As examples of additional solvents, mention is made of methyl, ethyl, isopropyl alcohols, hexane, benzene, etc.

In place of the sodium hydroxide of the preceding examples, other salt forming agents may be used, e. g. sodium acid carbonate, sodium carbonate, potassium hydroxide, calcium hydroxide, ammonium hydroxide, aluminum acetate, etc.

This invention has the advantage that 3-acetoxy-bis-nor-cholenic acid may be quickly and easily prepared in high yields directly from crude mixtures. It is not necessary to first obtain pure stigmasterol. A large amount of stigmasterol is lost by such purification process. This invention has advantages over the other prior art method of preparing 3-acetoxy-bis-nor-cholenic acid above described in that the other sterols contained in the crude mixtures are not oxidized. It is difficult to separate the small amounts of the desired acids from the oxidation mixtures.

While I have disclosed the preferred embodiments of my invention, it will be readily apparent to those skilled in the art that many variations and modifications may be made therein without departing from the spirit of the invention. Accordingly, the scope of the invention is to be limited solely by the appended claims construed as broadly as permissible in view of the prior art.

I claim:

1. A process which comprises treating a crude mixture of sterols containing stigmasterol with an esterifying agent and bromine in the proportion of one molecule per molecule of sterol, passing ozonized oxygen therethrough, removing the bromine and recovering an acylated-3-hydroxy-bis-nor-cholenic acid from the mixture.

2. A process which comprises treating a crude mixture of sterols containing stigmasterol with an organic esterifying agent and bromine in the proportion of one molecule per molecule of sterol, passing ozonized oxygen therethrough, removing the bromine and recovering an acylated-3-hydroxy-bis-nor-cholenic acid from the mixture.

3. A process which comprises treating a crude mixture of sterols containing stigmasterol with an acteylating agent and bromine in the proportion of one molecule per molecule of sterol, passing ozonized oxygen therethrough, debrominating the resulting product and recovering an acetylated-3-hydroxy-bis-nor-cholenic acid salt from the mixture.

4. A process which comprises reacting a crude mixture of sterols containing stigmasterol with an acylating agent to protect the hydroxyl groups and with bromine in the proportion of one molecule per molecule of sterol to protect the double bonds thereof, passing ozonized oxygen through the mixture, debrominating the product and recovering an acylated-3-hydroxy-bis-nor-cholenic acid salt therefrom.

5. A process which comprises reacting a crude mixture of sterols containing stigmasterol with a solvent with an acetylating agent to protect the hydroxyl groups and with bromine in the proportion of one molecule per molecule of sterol to protect the double bonds thereof, passing ozonized oxygen through the mixture, debrominating the product and precipitating the 3-acetoxy-bis-nor-cholenic acid as an alkali metal salt.

6. A process which comprises reacting a crude mixture of sterols containing stigmasterol in a solvent with an acetylating agent to protect the hydroxyl groups and with bromine in the proportion of one molecule per molecule of sterol to protect the double bonds thereof, passing ozonized oxygen through the mixture, debrominating the product and precipitating the 3-acetoxy-bis-nor-cholenic acid as an alkali metal salt.

7. A process which comprises reacting a crude mixture of sterols containing stigmasterol with an acetylating agent and bromine in the proportion of one molecule per molecude of sterol in the presence of ether, passing ozonized oxygen through the solution, driving off the ether, debrominating the mixture with zinc and driving off the bromine, taking up the resulting product in ether and precipitating the 3-acetoxy-bis-nor-cholenic acid as a metal salt.

8. The process of claim 7 in which the metal salt is acidified and the free 3-acetoxy-bis-nor-cholenic acid is recovered from the acid solution.

9. A process which comprises reacting a crude mixture of sterols from soya bean oil with an acetylating agent and bromine in the proportion of one molecule per molecule of sterol in the presence of ether, passing ozonized oxygen through the solution, driving off the ether, debrominating the mixture with zinc and driving off the bromine, taking up the resulting product in ether and precipitating the 3-acetoxy-bis-nor-cholenic acid as a metal salt.

10. The process of claim 9, in which sitosterol is recovered from the ether extract.

11. A process for the manufacture of 3-acetoxy-bis-nor-cholenic acid which comprises the step of oxidising by means of ozone the esters of a crude mixture of sterols containing stigmasterol the ring double bonds of which have been protected against oxidation.

JAMES R. MYLES.